United States Patent Office 3,652,528

Patented Mar. 28, 1972

3,652,528 PROCESS FOR THE POLYMERIZATION OF ISOPRENE IN HOMOGENEOUS PHASE

Augusto Bonfardeci, Milan, Italy, assignor to Montecatini Edison S.p.A., Milan, Italy No Drawing. Filed Feb. 11, 1970, Ser. No. 10,622
Claims priority, application Italy, Feb. 11, 1969, 12,702/69
Int. Cl. C08d *1/12, 3/02, 3/10*
U.S. Cl. 260—94.3 6 Claims

ABSTRACT OF THE DISCLOSURE

There is disclosed a process for polymerizing isoprene, in homogeneous phase, to high polymers in which the proportion of isoprene units having cis-1,4 enchainment is practically identical with that of natural rubber. The process utilizes a ternary catalyst system prepared by mixing $TiCl_4$, an organometallic compound of the type $AlR_2Cl$ in which R is an alkyl group, and an unsaturated polymer, preferably a polybutadiene or polyisoprene having at least prevailingly cis-1,4 structure and a molecular weight such that the catalyst is soluble in the polymerization mixture and preferably corresponding to an intrinsic viscosity of from 0.4 to 0.8 dl./g., determined in toluene at 30° C.

THE PRIOR ART

It is known that polyisoprenes having a 1,4-cis enchainment of the isoprene units can be obtained by polymerizing the monomer in contact with the catalyst system $AlR_3$—$TiCl_4$ (R=alkyl or aryl radical).

While the structure of the polyisoprenes thus obtained is close to the structure of natural rubber, those polymers do differ from natural rubber in respect to various characteristics, mainly a lower content of isoprene units with 1,4-cis enchainment.

As is known, the elastomeric properties of a polyisoprene are in general much better the higher the content of 1,4-cis units and the smaller the content of 3,4- and 1,4-trans units. While the difference in cis-1,4 units between natural rubber and the polyisoprenes obtained using the $AlR_4$—$TiCl_4$ catalyst systems is relatively small, it is the fact that the elastomers obtained from the cis-1,4 polyisoprenes prepared by means of the $AlR_3$—$TiCl_4$ catalyst systems have elastic properties and mechanical characteristics which are definitely inferior to those of natural rubber.

On the other hand, catalysts prepared from dialkyl aluminum halides and $TiCl_4$ do not yield polyisoprenes having 1,4-cis enchainment of the monomer units. Such systems become active for the polymerization of isoprene to a polymer having prevailingly cis-1,4 structure when an organic silicium compound, such as for instance the silicates and alkyl silicates disclosed in the Montecatini Edison Italian Patent No. 802,645 is used as third catalyst-forming component. The addition of the silicium compound is necessary to obtain a polymer having prevailingly cis-1,4 structure.

THE PRESENT INVENTION

The primary object of this invention was to provide a new and improved process for polymerizing isoprene to high molecular weight polymers which is practically identical to natural rubber with respect to the proportion of the monomer units having 1,4-cis structure and in other respects.

This and other objects are accomplished by the present invention in accordance with which isoprene is polymerized in contact with a ternary catalytic system prepared from (a) titanium tetrachloride, (b) an organometallic compound of the $R_2AlCl$ type, in which R is an alkyl radical having from 1 to 6 carbon atoms, preferably from 2 to 4 carbon atoms; and (c) an unsaturated polymer, preferably a polybutadiene or a polyisoprene having a structure and molecular weight such that the catalyst is soluble in the polymerization mixture, for instance a polybutadiene or polyisoprene having prevailingly cis-1,4 structure and a molecular weight corresponding to an intrinsic viscosity of from 0.4 to 0.8 dl./g., determined in toluene at 130° C.

The molecular weight of the polymer used as the third catalyst-forming component (c) is important to the formation of a soluble catalyst, inasmuch as the solubility of the catalyst in the reaction mass increases with increase in the molecular weight of component (c).

The Al/Ti molar ratio may be varied within wide limits.

The polymerization temperature may vary over a wide range but is preferably in the range from 0° C. to 60° C.

With sufficiently long reaction times, it is possible to achieve a complete conversion of the monomer.

The polymerization is carired out in an inert diluent which may be an aliphatic hydrocarbon solvent, a cycloaliphatic hydrocarbon solvent, or an aromatic hydrocarbon solvent.

The advantage of the present process resides in the possibility of obtaining high molecular weight polyisoprenes having a high content of 1,4-cis units (greater than 97%) by using the unsaturated polymer containing double bonds as third catalyst-forming component, instead of an organic silicium compound.

Using the ternary catalysts according to this invention, the isoprene polymerization proceeds in a homogeneous phase. In fact, during reduction of the titanium compound by the dialkyl aluminum halide, there is no formation of the macroscopic beta-$TiCl_3$ crystals which are characteristic of all polymerizations in heterogeneous phase carried out with the aid of catalysts based on $TiCl_4$ and an aluminum trialkyl or dialkyl aluminum monochloride. One effect of the absence of such macrocrystals is a greater dispersion of the active polymerization centers. The dispersion is such that there are obtained very high yields in grams of polymer per gram of titanium (e.g., 2800 g. of polymer per 1.0 g. of titanium).

The polyisoprene obtained by the present process can be vulcanized by the methods used conventionally for the vulcanization of highly unsaturated elastomers, particularly with recipes based on sulphur and accelerators. The vulcanized elastomers obtained have mechanical and dynamic properties which are practically identical with those of natural rubber.

The polyisoprene obtained by this method can be dispersed in an aqueous medium to form latices having properties practically identical with those of natural rubber.

The following examples are given to illustrate the invention and are not intended to be limiting.

EXAMPLE 1

(A) Preparation of the catalyst 19 ml. benzene, 0.10 g. of isoprene polymer, 95% of the monomer units of which have 1,4-cis enchainment and having an intrinsic visocsity in toluene at 30° C. at 0.8 dl./g. were introduced, under nitrogen, into a 50 ml. test tube.

On completion of the solution, 0.058 ml. of $TiCl_4$ corresponding to 100 mg. of said compound were added. Thereupon, there were added 0.15 ml. of $Al(C_2H_5)_2Cl$ dissolved in 1.0 ml. of benzene. The mixture was then kept for about 5 minutes at 40° C. just to favor the formation of the catalyst. In this way a suspension having a brownish color was obtained. No precipitate was formed. The catalyst thus prepared when added to a carefully anhydrous benzene solution of isoprene, dissolves completely starting a polymerization in a homogeneous phase. In the specific case 1.0 ml. of the catalytic solution cited above corresponds to a quantity of titanium equal to 1.25 mg.

(B) Polymerization

Into a 50 ml. graduated test tube were introduced 30 ml. of benzene and 10 ml. of freshly distilled isoprene. To this were then added 1.5 ml. of the catalytic solution prepared as described under (A), corresponding to 1.88 mg. of titanium. The homogeneous polymerization mixture took on a brown-yellow shade. The polymerization was allowed to proceed for 12 hours at room temperature, after which the product was discharged into methanol thereby obtaining 4 g. of polyisoprene showing an intrinsic viscosity, in toluene at 30° C., of 2.6 dl./g.

The NMR spectrum of the polymer showed a content in 1,4 cis units of not less than 97%.

The yield in g. of polymer per g. of titanium was equal to 2120 g.

The gel content was less than 1%.

EXAMPLE 2

Into a graduated 50 ml. test tube were introduced 30 ml. of benzene and 10 ml. of freshly distilled isoprene. To this mixture were then added 1.5 ml. of the catalytic solution described in Example 1, wherein, instead of the polyisoprene, there was used as third component of the catalyst a polybutadiene having a 96% content in 1,4 cis units and the same viscosity as the polyisoprene. The homogeneous polymerization mixture took on a brown-yellow color of the same type as that of Example 1. The mixture was then left to polymerize at room temperature for 12 hours. After this period the reaction product was discharged into methanol, thereby obtaining 3.2 g. of polyisoprene showing an intrinsic viscosity, in toluene at 30° C., of 2.2 dl./g.

The NMR spectrum of the polymer showed a content in 1,4 cis units of not less than 97%.

The yield in g. of polymer per g. of titanium was equal to 1700 g.

The gel content was less than 1%.

EXAMPLE 3

Into a 50 ml. test tube were introduced 30 ml. of benzene and 10 ml. of isoprene. The conditions of operation are the same as in Example 1, except that the polymerization temperature is 0° C. Also at this temperature the polymerization occurred in a homogeneous phase.

After 24 hours the reaction product is discharged into methanol thereby obtaining the same results as in Example 1.

EXAMPLE 4

Example 1 was repeated, except that the polymerization temperature was 50° C. Also at this temperature the polymerization occurred in a homogeneous phase. After 6 hours, the reaction product was discharged into methanol, thereby obtaining 5.3 g. of polyisoprene having an intrinsic viscosity in toluene at 30° C. of 2.6 dl./g.

The NMR spectrum of the polymer showed a content in 1,4-cis units not less than 98%.

The yield in grams of polymer per gram of titanium amounted to 2,800 g.

The gel content was less than 1%.

EXAMPLE 5

As third component for the formation of the catalyst there was used a polybutadiene having 75% of 1,4 cis units, 21% of 1,4 trans units and 4% of 1,2 units. By operating as in Example 2 there were obtained 3.4 g. of polyisoprene having a 1,4 cis units content of 94% and an intrinsic viscosity, in toluene at 30° C., of 2.1 dl./g.

As will be apparent, various changes may be made in practicing the invention without departing from the spirit thereof. Therefore, we intend to include in the scope of the appended claims, all modifications which will be obvious to those skilled in the art from the description and working examples given herein.

What is claimed is:

1. A process for the preparation of high molecular weight polyisoprene, having a content of isoprene units with 1,4-cis enchainment of at least 97%, which process is characterized in that isoprene is polymerized in an inert solvent in contact with a catalytic system prepared from (a) titanium tetrachloride (b) an organometallic compound $AlR_2Cl$ in which R is an alkyl group containing from 1 to 6 carbon atoms, and (c) an unsaturated polymer selected from the group consisting of polyisoprene and polybutadiene and having a molecular weight such that the catalyst system is soluble in the polymerization mixture and the polymerization reaction proceeds in homogeneous phase.

2. The process according to claim 1, further characterized in that the unsaturated polymer (c) is an at least prevailingly 1,4-cis polybutadiene having a molecular weight corresponding to an intrinsic viscosity of from 0.4 to 0.08 dl./g., determined in toluene at 30° C.

3. The process according to claim 1, further characterized in that the unsaturated polymer (c) is an at least prevailingly 1,4-cis polyisoprene having a molecular weight corresponding to an intrinsic viscosity of from 0.4 to 0.08 dl./g., determined in toluene at 30° C.

4. The process according to claim 1, further characterized in that the isoprene is polymerized at a temperature of from 0° C. to 60° C.

5. The process according to claim 2, further characterized in that the isoprene is polymerized at a temperature of from 0° C. to 60° C.

6. The process according to claim 1, further characterized in that the inert solvent is selected from the group consisting of aliphatic hydrocarbons, mixtures of aliphatic hydrocarbons, cycloaliphatic hydrocarbons and aromatic hydrocarbons.

References Cited

UNITED STATES PATENTS

| | | | |
|---|---|---|---|
| 3,177,183 | 4/1965 | Naylor et al. | 260—82.1 |
| 3,466,272 | 9/1969 | Mori et al. | 260—94.3 |
| 3,489,823 | 1/1970 | Naarman et al. | 260—879 |
| 3,547,864 | 12/1970 | Lasis | 260—94.3 |

JOSEPH L. SCHOFER, Primary Examiner

R. A. GAITHER, Assistant Examiner

U.S. Cl. X.R.

260—82.1, 879